US011807752B2

(12) United States Patent
Schulz et al.

(10) Patent No.: US 11,807,752 B2
(45) Date of Patent: Nov. 7, 2023

(54) PROCESS FOR PREPARING GRAFT RUBBER COMPOSITIONS WITH IMPROVED DEWATERING

(71) Applicant: INEOS STYROLUTION GROUP GMBH, Frankfurt am Main (DE)

(72) Inventors: Tobias Schulz, Cologne (DE); Wolfgang Fischer, Heidelberg (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 360 days.

(21) Appl. No.: 17/262,284

(22) PCT Filed: Jul. 23, 2019

(86) PCT No.: PCT/EP2019/069764
§ 371 (c)(1),
(2) Date: Jan. 22, 2021

(87) PCT Pub. No.: WO2020/020869
PCT Pub. Date: Jan. 30, 2020

(65) Prior Publication Data
US 2021/0269631 A1   Sep. 2, 2021

(30) Foreign Application Priority Data
Jul. 24, 2018   (EP) .................................... 18185248

(51) Int. Cl.
| *C08L 51/00* | (2006.01) |
| *C08F 220/18* | (2006.01) |
| *C08F 2/22* | (2006.01) |
| *C08F 6/00* | (2006.01) |
| *C08F 6/22* | (2006.01) |
| *C08F 212/08* | (2006.01) |
| *C08F 220/44* | (2006.01) |
| *C08K 3/30* | (2006.01) |
| *C08L 25/12* | (2006.01) |
| *C08L 55/02* | (2006.01) |

(52) U.S. Cl.
CPC .............. *C08L 51/003* (2013.01); *C08F 2/22* (2013.01); *C08F 6/008* (2013.01); *C08F 6/22* (2013.01); *C08F 212/08* (2013.01); *C08F 220/1804* (2020.02); *C08F 220/44* (2013.01); *C08K 3/30* (2013.01); *C08L 25/12* (2013.01); *C08L 55/02* (2013.01); *C08K 2003/3063* (2013.01); *C08L 2201/52* (2013.01); *C08L 2205/03* (2013.01); *C08L 2207/53* (2013.01)

(58) Field of Classification Search
CPC ...... C08F 265/04; C08F 6/22; C08L 2207/53; C08L 2201/52
See application file for complete search history.

(56) References Cited

U.S. PATENT DOCUMENTS

| 3,553,167 | A | 1/1971 | Schnell et al. |
| 4,009,226 | A | 2/1977 | Ott et al. |
| 4,156,069 | A | 5/1979 | Prevorsek et al. |
| 4,181,788 | A | 1/1980 | Wingler et al. |
| 4,189,567 | A | 2/1980 | Branlard et al. |
| 4,224,419 | A | 9/1980 | Swoboda et al. |
| 4,311,823 | A | 1/1982 | Imai et al. |
| 4,334,053 | A | 6/1982 | Freitag et al. |
| 4,605,699 | A | 8/1986 | Mitulla et al. |
| 4,634,734 | A | 1/1987 | Hambrecht et al. |
| 4,772,743 | A | 9/1988 | Schmidt et al. |
| 4,788,253 | A | 11/1988 | Hambrecht et al. |
| 4,880,875 | A | 11/1989 | Wassmuth et al. |
| 4,982,014 | A | 1/1991 | Freitag et al. |
| 5,071,946 | A | 12/1991 | Schmidt et al. |
| 5,100,945 | A | 3/1992 | Schmidt et al. |
| 5,314,990 | A | 5/1994 | Jansen et al. |
| 5,910,276 | A | 6/1999 | Guntherberg et al. |
| 5,958,316 | A | 9/1999 | Guntherberg et al. |
| 5,994,463 | A | 11/1999 | Eckel et al. |
| 6,140,426 | A | 10/2000 | Sarabi et al. |

(Continued)

FOREIGN PATENT DOCUMENTS

| CA | 1173998 A | 9/1984 |
| DE | 2021398 A1 | 11/1970 |

(Continued)

OTHER PUBLICATIONS

Rindonaa et al., electronic translation of JP 2596953, Apr. 1997.*

(Continued)

Primary Examiner — Jeffrey C Mullis
(74) Attorney, Agent, or Firm — RAPHAEL BELLUM PLLC

(57) ABSTRACT

A process for the production of a graft copolymer composition is presented, which is based on acrylonitrile-styrene-acrylate (ASA) or acrylonitrile-butadiene-styrene (ABS) graft copolymers. The graft copolymers obtained by emulsion polymerization and precipitation show improved dewatering behavior after precipitation. Based on this method ASA and ABS graft copolymers with low residual humidity can be obtained. Furthermore, the invention relates to a process for the production of a thermoplastic molding composition comprising at least one thermoplastic styrene copolymer, in particular a styrene-acrylonitrile copolymer, the graft copolymer obtained by the process, and optional further components.

16 Claims, No Drawings

(56) References Cited

U.S. PATENT DOCUMENTS

| | | |
|---|---|---|
| 2003/0181583 A1 | 9/2003 | Duijzings et al. |
| 2007/0244227 A1* | 10/2007 | Eipper .................... C08L 67/02 523/400 |
| 2015/0065623 A1† | 3/2015 | Seidel |
| 2015/0267048 A1* | 9/2015 | Wakita .................... C08L 69/00 525/479 |
| 2016/0083572 A1 | 3/2016 | Niessner et al. |
| 2016/0297957 A1 | 10/2016 | Boeckmann et al. |
| 2019/0264021 A1† | 8/2019 | Fischer |

FOREIGN PATENT DOCUMENTS

| | | |
|---|---|---|
| DE | 1495626 B1 | 6/1971 |
| DE | 2232877 A1 | 1/1974 |
| DE | 2420358 A1 | 12/1975 |
| DE | 2703376 A1 | 8/1977 |
| DE | 2714544 A1 | 10/1977 |
| DE | 2815098 A1 | 10/1978 |
| DE | 2724360 A1 | 12/1978 |
| DE | 2826925 A1 | 1/1980 |
| DE | 3000610 A1 | 7/1980 |
| DE | 2940024 A1 | 4/1981 |
| DE | 3007934 A1 | 9/1981 |
| DE | 3149358 A1 | 6/1983 |
| DE | 3414118 A1 | 10/1985 |
| DE | 3615607 A1 | 11/1987 |
| DE | 3639904 A1 | 6/1988 |
| DE | 3832396 A1 | 2/1990 |
| DE | 3913509 A1 | 10/1990 |
| DE | 19713509 A1 | 10/1998 |
| EP | 0022200 A1 | 1/1981 |
| EP | 0111260 A1 | 6/1984 |
| EP | 0270948 A2 | 6/1988 |
| EP | 0459161 A2 | 12/1991 |
| EP | 0734825 A1 | 10/1996 |
| GB | 1544143 A | 4/1979 |
| JP | H01217005 A | 8/1989 |
| JP | 2596953 B2 † | 4/1997 |
| KR | 20080058661 A | 6/2008 |
| WO | 02/10222 A1 | 2/2002 |
| WO | 2013/160029 A1 | 10/2013 |
| WO | 2014/170407 A1 | 10/2014 |
| WO | 2015/078751 A1 | 6/2015 |
| WO | 2018/060111 A1 | 4/2018 |
| WO | 2012/022710 A1 | 2/2021 |

OTHER PUBLICATIONS

Lange, "Bestimmung von Teilchengroben aus Trubung und Brechungsinkrement," Kolloid-Z. u. Z. Polymere, Band 223, Heft 1, 1967, pp. 24-30; see specification for relevancy at p. 14, lines 10-11.

Scholtan et al., "Bestimmung der Teilchengrobenverteilung von Latices mit der Ultrazentrifuge," Kolloid-Z. u. Z. Polymere 250, 1972, pp. 782-796; see specification for relevancy at p. 14, lines 17-18.

Wohlleben et al., "Measurement of Particle Size Distribution of Polymer Latexes," 2010, Editors: L. Gugliotta, J. Vegam p. 130-153.

\* cited by examiner
† cited by third party

PROCESS FOR PREPARING GRAFT RUBBER COMPOSITIONS WITH IMPROVED DEWATERING

The present invention is directed to a process for the production of graft copolymer compositions, which are based on acrylonitrile-styrene-acrylate (ASA) or acrylonitrile-butadiene-styrene (ABS) graft copolymers. The graft copolymers obtained by emulsion polymerization and precipitation show an improved dewatering behavior after precipitation. Based on the inventive method acrylonitrile-styrene-acrylate (ASA) and acrylonitrile-butadiene-styrene (ABS) graft copolymers with low residual humidity can be obtained more easily. Furthermore, the invention relates to a process for the production of a thermoplastic molding composition comprising at least one thermoplastic styrene copolymer, in particular a styrene-acrylonitrile copolymer, the graft copolymer obtained by the process, and optional further components.

Acrylonitrile-butadiene-styrene copolymers (ABS) and acrylonitrile-styrene-acrylate copolymers (ASA) have already been used for many years in large quantities as thermoplastic molding compositions for the production of moldings of various types. It is known that styrene-acrylonitrile copolymers (SAN) or methylstyrene-acrylonitrile (AMSAN) copolymers can be modified for improved impact resistance by incorporating one or more graft rubbers (also referred to as graft copolymers in the following), such as grafted polybutadiene rubbers or grafted cross-linked acrylates. In principle, these impact-modified SAN molding compositions can be produced by polymerization of styrene and acrylonitrile in the presence of e.g. a polybutadiene rubber and/or by subsequent blending of a graft copolymer with a separately produced styrene-acrylonitrile matrix. It is possible to achieve wide variations of the property profiles of the molding compositions and of the moldings produced therefrom. Particularly important properties of ABS and ASA molding compositions, are advantageous mechanical properties such as high toughness (impact resistance, notched impact resistance), high elasticity (modulus of elasticity), good processability (thermoplastic flowability, MVR), and good heat resistance.

Typically, the graft rubber copolymers are produced by preparing crosslinked acrylate latices or butadiene latices as graft bases via emulsion polymerization and afterwards preparing one or more graft shells by grafting a mixture of e.g. styrene and acrylonitrile or corresponding monomers via graft emulsion polymerization. Often the average particle size of the graft rubber is adjusted in a controlled manner by agglomeration before the graft polymerization reaction. This agglomeration can e.g. be achieved by treating the rubber with a salt or a salt/acid solution. WO 2014/170407 describes the agglomeration by using a specific agglomerating copolymer.

WO 2012/022710 describes an agglomeration with acetic anhydride. A graft copolymer is then typically produced via reaction of the agglomerated rubber with styrene and acrylonitrile, using an initiator (graft copolymerization). These processes are described e.g. in EP-A 022 200.

After the emulsion polymerization the graft copolymer latex is usually precipitated using salt and/or acid solution yielding a suspension of coarse particles, for example in the range of 500 to 2.000 μm. Often the majority of water is removed by centrifugation or filtration from this suspension. The resulting rubber is a wet powder and may then directly be fed to an extruder for primary compounding and dewatering. Alternatively, the resulting rubber wet powder may be dried by using common methods. Then the product is typically used in form of a dry powder in the subsequent compounding steps.

Precipitation (also referred to as coagulation) of polymer latices by using metal cations, in particular earth alkaline metal ions, is well known and described in many patent documents, e.g. DE-A 2 021 398, DE-A 2 815 098 and EP-B 0 459 161. None of these documents specifically mentions residual humidity after centrifugation or dewatering behavior as special property. Instead grain size distribution or waste water contamination is discussed.

Conventionally, the graft copolymer is washed and dried after the graft polymerization reaction. The document EP-A 0 734 825 describes the dewatering and drying of an ABS graft copolymer in an extruder. It is of particular interest to reduce the residual humidity after precipitation (coagulation) and dewatering (e.g. by centrifugation or filtration) as much as possible to save energy. It is advantageous if less water needs to be evaporated in the extruder or in further drying steps. It is also a goal to increase throughput in the extruder(s), meaning that more graft copolymer can be processed.

It was surprisingly found that special precipitation conditions yield to particularly low residual humidity after centrifugation. It has been found that the dewatering is facilitated, if the molar ratio of alkaline to earth alkaline metal ions in the graft copolymer (in particular after precipitation and dewatering) is equal or below 0.16. Furthermore, it has been found that a solid content equal or above 10.2% in the precipitation mixture during the precipitation (coagulation) of the latex leads to significantly improved dewatering of the precipitated latex.

The document WO 2013/160029 describes thermoplastic resin compositions comprising a graft polymer obtained by a emulsion polymerization process with a specific molar ratio Na/(Mg+Ca) for defect free Class A surfaces of molded parts. A preferred molar ratio Na/(Mg+Ca) of at least 0.15 and at most 1.0 should results in smaller salt inclusions and less surface defects storage under hot-wet conditions.

The document KR-A 1020080058661 describes a method for preparing graft copolymers by emulsion polymerization, wherein the graft latex is coagulated using an acid solution and wherein the pH value is controlled by using an aqueous basic solution, in particular NaOH or NaHCO$_3$, as being in the range of pH from 3 to 7.

The present invention is directed to a process for the production of a graft copolymer composition comprising:
B: from 90 to 100% by weight, preferably 95 to 100% by weight, of at least one graft copolymer B comprising:
  B1: 50 to 90% by weight, preferably 55 to 90% by weight, more preferably 55 to 65% by weight, based on the graft copolymer B, of at least one graft base B1, obtained by emulsion polymerization of:
    B11: 50 to 100% by weight, preferably 87 to 99.5% by weight, based on the graft base B1, at least one monomer B11 selected from $C_1$-$C_8$ alkyl(meth)acrylate (preferably n-butylacrylate) and butadiene;
    B12: 0 to 10% by weight, preferably 0.1 to 5% by weight, more preferably 1 to 2.5% by weight, based on the graft base B1, of at least on polyfunctional cross-linking monomer B12; preferably selected from allyl(meth)acrylate, divinylbenzene, diallylmaleate, diallylfumarate, diallylphthalate, triallylcyanurat, triallylisocyanurat and dihydrodicyclopentadienyl acrylate (DCPA)

B13 0 to 50% by weight, preferably 0 to 20% by weight, more preferably 0 to 10% by weight, based on the graft base B1, of at least one further monomer B13 selected from styrene, alpha-methylstyrene, $C_1$-$C_4$-alkylstyrene, acrylonitrile, methacrylonitrile, isoprene, butadiene, chloroprene, methylmethacrylate, alkylenglycol-di(meth)acrylate, vinylmethylether where the sum of B11, B12 and B13 equals 100% by weight and B2: 10 to 50% by weight, preferably 10 to 45% by weight, more preferably 30 to 45% by weight, based on the graft copolymer B, at least one graft shell B2, which is obtained via emulsion polymerization in the presence of the at least one graft base B1 of:

B21 50 to 100% by weight, preferably 50 to 95% by weight, more preferably 65 to 80% by weight, most preferably 75 to 80% by weight, based on graft shell B2, of at least one monomer B21, selected from styrene, alpha-methylstyrene or mixtures of styrene and at least one further monomer selected from alpha-methylstyrene, p-methylstyrene and $C_1$-$C_8$ alkyl(meth)acrylate (preferably $C_1$-$C_4$ alkyl(meth)acrylate, e.g. methyl methacrylate or ethyl methacrylate) and B22 0 to 50% by weight, preferably 5 to 50% by weight, more preferably 20 to 35% by weight, most preferably 20 to 25% by weight, based on graft shell B2, of at least one monomer B22 selected from acrylonitrile or mixtures of acrylonitrile and at least one further monomer chosen from methacrylnitril, acrylamide, vinlymethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide);

where the total sum of graft base B1 and graft shell B2 equals 100% by weight,

K1: from 0 to 10% by weight, preferably 0 to 5% by weight of at least one other component K1, comprising the following steps:

a) preparation of the at least one graft copolymer B encompassing emulsion polymerization of the monomers B21 and B22 in the presence of at least one graft base B1 to form the at least one graft shell B2, wherein the graft copolymer B is obtained in form of a latex;

b) precipitation of the at least one graft copolymer B after its emulsion polymerization in step a), wherein the graft copolymer B latex is mixed with at least one precipitation solution PS resulting in a precipitation mixture, wherein the at least one precipitation solution PS comprises at least one alkaline-earth metal salt, preferably at least one salt selected from magnesium salts and calcium salts, and wherein the precipitation mixture has a solid content of more than 10.2% by weight;

c) mechanical dewatering of the precipitated graft copolymer B, where a graft copolymer B having a water content equal or less than 40% by weight is obtained, and wherein the molar ratio of alkaline metal ions to alkaline-earth metal ions in the graft copolymer B is equal or less than 0.16;

d) optionally washing of the dewatered graft copolymer B;

e) optionally drying of the dewatered graft copolymer B obtained in step c) or d);

f) optionally addition of one or more optional components K1.

Graft Copolymer B

The graft copolymer composition comprises at least 90% by weight, preferably at least 95% by weight, based on the total graft copolymer composition, of at least one graft copolymer B as described in the following.

Preferably, the graft copolymer B is selected from acrylonitrile styrene acrylate (ASA) graft copolymers and acrylonitrile butadiene styrene (ABS) graft copolymers. ASA graft copolymers typically comprise a crosslinked polyalkyl (meth)acrylate rubber as graft base B1, in particular a cross-linked polybutylacrylate graft base B1. ABS graft copolymers typically comprise a polybutadiene rubber or a styrene-butadiene rubber as graft base B1.

Typically, the graft base B1 consists of a polymer, preferably an at least partially cross-linked polymer, with glass transition temperature below 0° C., preferably below −20° C., more preferably below −40° C., wherein the glass transition temperature $T_g$ is measured by dynamic mechanical analysis (DMA) using a frequency of 1 Hz.

The at least one graft shell B2 typically consists of monomers which copolymerize yielding a polymer with a glass transition temperature of more than +20° C., preferably more than +60° C. Preferred monomers of graft shell B2 (monomers B21 and B22) are selected from styrene, α(alpha)-methylstyrene, (meth)acrylonitrile, methyl(meth)acrylate, ethylacrylate, N-phenylmaleic imide and maleic anhydride.

Preferred monomers B11 for producing graft base B1 are butadiene, alkylacrylates and/or alkylmethacrylate (also referred to as alkyl(meth)acrylates) with 1 to 8, preferably 4 to 8, carbon atoms being present in the alkyl group. Preferably, the monomer B11 is at least one monomer selected from $C_4$-$C_8$ alkyl acrylates, preferably selected from butyl acrylate, ethylhexyl acrylate and cyclohexyl acrylate. Especially preferred is n-butylacrylate and/or 2-ethylhexylacrylate, more preferred is n-butylacrylate alone or in mixture with other monomers B11, as monomer B11.

In order to have cross-linking of the $C_1$-$C_8$-alkyl(meth) acrylate monomers B11 and therefore cross-linking of the graft base B1, monomers B11 are polymerized in presence of 0.1 to 10% by weight, preferably 0.1 to 5% by weight, preferably 0.5 to 3% by weight, preferably 1 to 4% by weight, more preferably 1 to 2.5% by weight, based on the graft base B1, of one or more polyfunctional, cross-linking monomer(s) B12. Suitable monomers B12 are especially polyfunctional, cross-linking monomers, that can be copolymerized with the mentioned monomers, especially B11 and B13. Suitable polyfunctional, cross-linking monomers B12 comprise two or more, preferred two or three, more preferred exactly two ethylenic double bonds, which are preferably not 1,3 conjugated. Examples for suitable polyfunctional, cross-linking monomers B12 are allyl(meth) acrylate, divinylbenzene, diallylester of carboxylic diacids, like e.g. diallylmaleate, diallylfumarate and diallylphthalate. The acrylic acid ester of tricyclodecenyl alcohol (dihydrodicyclopentadienyl acrylate (DCPA), as described in DE-A 1 260 135, represents also a preferred polyfunctional, cross-linking monomer B12.

Especially, the polyfunctional, cross-linking monomer B12 (preferably used for cross-linking of polyalkyl(meth) acrylate rubber) is at least one monomer selected from allyl(meth)acrylate, divinylbenzene, diallymaleate, diallyl-fumarate, diallylphthalate, triallylcyanurate, triallylisocyanurate and dihydrodicyclopentadienyl acrylate (DCPA), preferably allyl(meth)acrylate, divinylbenzene, diallylmaleate, diallylfumarate, diallylphthalate and dihydrodicyclopentadienyl acrylate (DCPA), preferably from ally(meth)acrylate and dihydrodicyclopentadienyl acrylate (DCPA).

In a preferred embodiment 1 to 2.5% by weight, preferably 1.5 to 2.2% by weight, based on the graft base B1, dihydrodicyclopentadienyl acrylate (DCPA) are used alone or in a mixture with at least one further of the above mentioned monomers B12, especially in mixture with allyl(meth)acrylate, as monomer B12.

Furthermore, the at least one graft base B1 can comprise optionally one or more co-polymerizable, monoethylenically unsaturated monomers B13, different from B11 and B12. Monomers B13 can for example be selected from butadiene, isoprene, styrene, acrylonitrile, methyl(meth)acrylate and vinylmethylether. Preferably, the further monomer B13 is at least one monomer selected from styrene, α(alpha)-methylstyrene, acrylonitrile; methacrylonitrile, methyl(meth)acrylate, isoprene, chloroprene, and $C_1$-$C_4$ alkyl styrene.

In a preferred embodiment the vinylaromatic monomer B21 (in particular each of monomers B21, B21' and B21") is styrene and/or α(alpha)-methylstyrene and the at least one ethylenically unsaturated monomer B22 (in particular each of monomers B22 and B22") is acrylonitrile or a mixture of acrylonitrile and at least one monomer selected from methacrylonitrile. acrylamide, vinylmethylether, maleic acid anhydride, phthalic acid anhydride, N-cyclohexylmaleimide and N-phenylmaleimide.

More preferably, the monomers B21 and B22 together, used for emulsion polymerization of graft copolymer B, are mixtures of styrene and acrylonitrile having a weight ratio of styrene to acrylonitrile in the range of 95: 5 to 50: 50, more preferably in the range of 80: 20 to 65: 35.

In a preferred embodiment the at least one graft base B1 is obtained by emulsion polymerization of
  B11: 70 to 99.9% by weight, preferably 87 to 99.5% by weight, based on the graft base B1, at least one $C_1$-$C_8$ alkyl(meth)acrylate, preferably n-butylacrylate and/or 2-ethylhexylacrylate, as monomer B11;
  B12: 0.1 to 10% by weight, preferably 0.1 to 5% by weight, more preferably 1 to 2.5% by weight, based on the graft base B1, of at least on poly-functional cross-linking monomer B12; preferably selected from allyl(meth)acrylate, divinylbenzene, diallylmaleate, diallylfumarate, diallylphthalate, triallylcyanurat, triallylisocyanurat and dihydrodicyclopentadienyl acrylate (DCPA);
  B13 0 to 29.5% by weight, preferably 0 to 25% by weight, more preferably 0 to 10% by weight, based on the graft base B1, of at least one further monomer, preferably selected from styrene, alpha-methylstyrene, $C_1$-$C_4$-alkylstyrene, acrylonitrile, methacrylonitrile, isoprene, butadiene, chloroprene, methylmethacrylate, alkylenglycol-di(meth)acrylate, vinylmethylether;
  wherein the sum of B11, B12 and B13 equals 100% by weight.

In a further preferred embodiment the at least one graft base B1 is obtained by emulsion polymerization of:
  B11: 90 to 99.9% by weight, preferably 97 to 99.5% by weight, more preferably 97.5 to 99% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, most preferably n-butylacrylate, as monomer B11;
  and
  B12: 0.1 to 10% by weight, preferably 0.5 to 3% by weight, more preferably 1 to 2.5% by weight, based on the graft base B1, at least one polyfunctional, cross-linking monomer B12; selected from allyl(meth)acrylate, divinylbenzene, diallylmaleate, diallylfumarate, diallylphthalate and dihydrodicyclopentadienyl acrylate (DCPA), especially from allyl(meth)acrylate and/or dihydrodicyclopentadienyl acrylate (DCPA);
  wherein the sum of B11 and B12 is 100% by weight (based on all monomers of graft base B1).

In particular, further suitable compositions of graft base B1, comprising monomers B11, B12 and optionally B13, as well as the general method for its preparation are described for example in DE-A 28 26 925, DE-A 31 49 358 and DE-A 34 14 118.

In a preferred embodiment the at least one graft shell B2 is obtained by emulsion polymerization in the presence of the at least one graft base B1 of:
  B21: 50 to 95% by weight, preferably 65 to 80% by weight, more preferably 70 to 80% by weight, based on the graft shell B2, at least one vinylaromatic monomer B21, wherein the monomer B21 is selected from styrene, α(alpha)-methylstyrene or mixtures of styrene and one further monomer selected from α(alpha)-methylstyrene, p(para)-methylstyrene, $C_1$-$C_4$-alkyl(meth)acrylate (e.g. methyl(meth)acrylate, ethyl(meth)acrylate), preferably selected from styrene, α(alpha)-methylstyrene or mixtures of styrene and α(alpha)-methylstyrene or methyl(meth)acrylate, and
  B22: 5 to 50% by weight, preferably 20 to 45% by weight, more preferably 20 to 40% by weight, also preferably 20 to 36% by weight, also preferably 20 to 33% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile.

Particularly, the graft copolymer B comprises a graft base B1, preferably a cross-linked polyalkyl(meth)acrylate rubber described above, and one or more graft shell(s) B2, in particular one, two or three graft shells B2, which differ in selection and amount of monomers B21 and B22 and which are obtained by stepwise grafting emulsion polymerization of the monomers B21 and/or B22 in the presence of graft base B1 res. in the presence of already grafted graft base.

In a preferred embodiment the graft copolymer B comprises at least one graft base B1, preferably a cross-linked polybutylacrylate rubber described above, and exactly one graft shell B2, obtained by emulsion polymerization of monomers B21 and B22 as described above, especially styrene and acrylonitrile, in presence of the graft base B1 (single-stage graft).

In a further preferred embodiment the graft copolymer B comprises at least one graft base B1, preferably a cross-linked polybutylacrylate rubber described above, and two graft shells B2' and B2", wherein B2' is obtained by emulsion polymerization of monomer B21, especially styrene, in presence of graft base B1 and the graft shell B2" is obtained by subsequent emulsion polymerization of monomers B21 and B22 as described above, especially styrene and acrylonitrile, in presence of graft base B1 grafted with B2' (two-stage graft).

In a preferred embodiment (single-stage graft) the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a particle size (in particular mean particle diameter $D_w$) in the range of 60 to 200 nm, preferably 60 to 150 nm, more preferably 60 to 100 nm;

B2: 30 to 50% by weight, preferably 35 to 45% by weight, more preferably 35 to 42% by weight, based on the graft copolymer B, one or more, preferably exactly one graft shell B2, obtained by emulsion polymerization, in presence of at least one graft base B1, of:

B21: 50 to 95% by weight, preferably 65 to 80% by weight, more preferably 70 to 80% by weight, based on the graft shell B2, at least one vinylaromatic monomer B21, wherein the monomer B21 is selected from styrene, α(alpha)-methylstyrene or mixtures of styrene and at least one further monomer selected from α(alpha)-methylstyrene, p-methylstyrene and $C_1$-$C_4$-alkyl(meth)acrylate (e.g. methyl(meth)acrylate, ethyl(methacrylate), preferably selected from styrene, α(alpha)-methylstyrene or mixtures of styrene with α(alpha)-methylstyrene or methyl(meth)acrylate; and B22: 5 to 50% by weight, preferably 20 to 35% by weight, more preferably 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;

wherein the total sum of graft base B1 and graft shell B2 is 100% by weight, and wherein the graft copolymer latex obtained in step a) has a particle size in the range of 60 to 140 nm.

In another preferred embodiment (two-stage graft B2' and B2") the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a particle size (in particular mean particle diameter $D_w$) in the range of 200 to 800 nm, preferably 300 to 600 nm, more preferably 350 to 550 nm;

B2': 10 to 30% by weight, preferably 10 to 20% by weight, more preferably 10 to 15% by weight, based on the graft copolymer B, at least one graft shell B2', which is obtained by emulsion polymerization, in presence of graft base B1, of B21' 100% by weight, based on graft shell B2', at least one vinylaromatic monomer B21', selected from styrene, α(alpha)-methylstyrene or a mixture of styrene and at least one further monomer selected from α(alpha)-methylstyrene, p-methylstyrene and $C_1$-$C_4$-alkyl(meth)acrylate (e.g. methyl(meth)acrylate, ethyl(meth)acrylate); and B2": 20 to 40% by weight, preferably 20 to 30% by weight, more preferably 25 to 30% by weight, based on the graft copolymer B, at least one graft shell B2", which is obtained by emulsion polymerization, in presence of graft base B1 grafted with B2', of:

B21: 50 to 95% by weight, preferably 65 to 80% by weight, more preferably 70 to 80% by weight, based on the graft shell B2", at least one vinylaromatic monomer B21", selected from styrene, α(alpha)-methylstyrene or mixtures of styrene and at least one further monomer selected from alpha-methylstyrene, p-methylstyrene and $C_1$-$C_4$-alkyl(meth)acrylate (e.g. methyl(meth)acrylate, ethyl(meth)acrylate), preferably selected from styrene, α(alpha)-methylstyrene or mixtures of styrene and α(alpha)-methylstyrene or methyl(meth)acrylate; and B22": 5 to 50% by weight, preferably 20 to 35% by weight, more preferably 20 to 30% by weight, based on the graft shell B2", at least one ethylenically unsaturated monomer B22", selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;

wherein the total sum of graft base B1, graft shell B2' and graft shell B2" is 100% by weight, and wherein the graft copolymer latex obtained in step a) has a particle size in the range of 400 to 700 nm.

According to a preferred embodiment, the graft copolymer B is a mixture of the above described embodiments of single-stage graft copolymer B and two-stage graft copolymer B (including graft B2' and B2").

More preferably monomers B21, B21' and B21" are styrene or mixtures of styrene and α-methylstyrene.

More preferably monomers B22 and B22" are acrylonitrile or mixtures of acrylonitrile and at least one further monomer selected from methacrylonitrile, maleic acid anhydride, N-cyclohexylmaleimide, N-phenylmaleimide, more preferably acrylonitrile or mixtures of acrylonitrile and at least one further monomer selected from methacrylonitrile and maleic acid anhydride. In a more preferred embodiment of the invention monomers B21, B21' and B21" are styrene and monomers B22 and B22' are acrylonitrile.

In a preferred embodiment of the invention the inventive process covers the synthesis of at least two, preferably two, three or four, different graft copolymers B-I and B-II, wherein graft copolymers B-I and B-II differ in their particle size. In this preferred embodiment graft copolymer B especially comprises at least two graft copolymers B-I and B-II, preferably based on crosslinked $C_1$-$C_8$ alkyl(meth)acrylate graft bases B1 as described above, wherein:

graft copolymer B-I (small size ASA rubber) has a particle size (in particular mean particle diameter $D_w$) in the range of 60 to 200 nm, preferably of 80 to 150 nm, more preferably of 90 to 100 nm, and graft copolymer B-II (large size ASA rubber) has a particle size (mean particle diameter $D_w$) in the range of 300 to 800 nm, preferably of 300 to 700 nm, more preferably of 400 to 600 nm.

Graft copolymer B-I (small size ASA rubber) is preferably obtained by emulsion polymerization of monomers B21 and B22 as described above, in particular styrene or α(alpha)-methylstyrene as B21 and acrylonitrile as B22, in presence of the previously prepared graft base B1 (B1-1) as described above.

Preferably, the graft copolymer B-II (large size ASA rubber) is desired to have a narrow particle size distribution, wherein particle size distribution $Q=(D_{90}-D_{10})/D_{50}$ is less than 0.3, preferably less than 0.2.

In another embodiment the graft copolymer can be an ABS graft copolymer comprising B1: 40 to 80% by weight, preferably 50 to 70% by weight, more preferably 55 to 65% by weight, based on the graft copolymer B, of at least one graft base B1, obtained by emulsion polymerization of butadiene as monomer B1; and B2: 20 to 60% by weight, preferably 30 to 50% by weight, more preferably 35 to 45% by weight, based on the graft copolymer B, at least one graft shell B2, as described above, preferably obtained via emulsion polymerization in the presence of the at least one graft base B1, of 65 to 80% by weight, based on graft shell B2, of styrene as monomer B21, and 20 to 35% by weight, based on graft shell B2, of acrylonitrile as monomer B22;

wherein the total sum of graft base B1 and graft shell B2 equals 100% by weight; and wherein the ABS graft copolymer latex has a particle size in the range of 100 to 500 nm.

Typically, particle size of graft copolymer latices can be given as the weight mean average particle diameter $D_w$ value. For example the weight mean average particle diameter D can be determined using turbidity measurement as described in H. Lange, Kolloid-Zeitschrift und Zeitschrift für Polymere, volume 223, issue 1. The weight mean average particle diameter $D_w$ (or De Broucker mean particle diameter), also referred to as mean particle diameter $D_w$ is an average size based on unit weight of particle.

Further, the particle size can be given as the median particle size DSO, for example determined from the particle size distribution obtained via ultracentrifuge measurement (described in W. Scholtan, H. Lange, Kolloid-Z. u. Z. Polymere 250, pages 782 to 796, 1972), electron microscopy or hydrodynamic chromatography HDC (for example described in W. Wohlleben, H. Schuch, "Measurement of Particle Size Distribution of Polymer Latexes", 2010, Editors: L. Gugliotta, J. Vega, pages 130-153). The median particle diameter $D_{50}$ represents the value of the particle size distribution curve where 50 Vol.-% of the particles (e.g. polyacrylate latex particles) have diameter smaller than the $D_{50}$ value and the other 50 Vol.-% have diameter larger than the $D_{50}$ value. In similar way for example the $D_{90}$ values gives the particle diameter, where 90 Vol.-% of all particles have a smaller diameter.

Preferably, the particle size mentioned in the present invention means the weight mean average particle diameter $D_w$ value determined using turbidity measurement, for example as described in Lange, Kolloid-Zeitschrift und Zeitschrift für Polymere, volume 223, issue 1.

Suitable crosslinked $C_1$-$C_8$ alkyl(meth)acrylate polymer graft bases B1 of graft copolymer B-II (referred to as B1-II) can be produced according to known procedures for the production of large size dispersion, conveniently via seeded polymerization, as described in DE 1 911 882 for the production of ASA polymers. According to this method a small size, cross-linked acrylate latex (seed latex) having particle size (in particular mean particle diameter $D_w$) from 50 to 180 nm, preferably less than 120 nm, which is obtained by emulsion polymerization of $C_1$-$C_8$-alkyl(meth)acrylates as monomers B11, cross-linking monomers B12 and optionally further co-monomers B13, is subjected to a further polymerization reaction. In particular, the reaction conditions are adjusted in way only allowing further growth of the present seed latex particles, without forming new latex particles (described in Journal of Applied Polymer Science, Vol. 9 1965, pages 2929 to 2938). Normally an initiator is used in said method. The particle size of the resulting graft copolymer B-II (large size rubber) can be adjusted by variation of the ratio of seed latex to monomers. Graft copolymer B-II is preferably obtained by emulsion polymerization of monomers B21 and B22 as described above, in particular styrene or α(alpha)-methylstyrene as B21 and acrylonitrile as B22, in presence of the previously prepared graft base B1-II.

Preferably the above described graft copolymers B-I and B-II are prepared, precipitated and dewatered separately in steps a) to c) and optionally d) to f). It is also possible to mix graft copolymer latices B-I and B-II after producing them separately in step a) and to precipitate them together in step b). Following steps, such as dewatering in step c), and washing in step d) can be carried out as described.

The weight ratio of graft copolymers B-I and B-II can be varied in wide ranges. Preferably the graft copolymer B is a mixture of graft copolymer B-I and B-II, wherein the weight ratio of B-I:B-II is from 90: 10 to 10: 90, preferably 80: 20 to 20: 80 and more preferably 70: 30 to 35: 65.

It is also possible to obtain graft copolymers with different particle sizes, especially bi-modal particle size distributions from 60 to 200 nm and 300 to 800 nm, via known agglomeration procedures. Graft copolymers with large and small size particles are for example described in DE-A 36 15 607.

Furthermore graft copolymers B having two or more different graft shells B2 can be used as described above. Further, graft copolymers with multi-layer graft shells are for example described in EP-A 0111260 and WO 2015/078751.

Step a)—Preparation of the Graft Copolymer B by Emulsion Polymerization

The inventive process encompasses the preparation of the at least one graft copolymer B encompassing the emulsion polymerization of the monomers B21 and B22 in the presence of at least one graft base B1 to form the at least one graft shell B2, wherein the graft copolymer B is obtained in form of a latex.

Often the graft copolymer B has a complex structure and it is in essence composed of one or more graft base(s) B1 and one or more graft shell(s) B2. Typically, the graft copolymer B is produced in form of a latex (rubber) by emulsion polymerization in step a), wherein firstly one or more graft base(s) B1 are obtained by emulsion polymerization of the monomers B11, B12 and optionally B13 as described and afterwards one or more graft shell(s) B2 are obtained by graft emulsion polymerization of the monomers B21 and B22 as described in the presence of one or more of the graft base B1.

Preferably, the graft copolymer B latex is polymerized by aqueous free-radical emulsion polymerization. The reaction is typically initiated via water-soluble or oil-soluble free-radical polymerization initiators, e.g. inorganic or organic peroxides, such as peroxodisulfate or benzoyl peroxide, or with the aid of redox initiator systems. The documents WO 2002/10222, DE-A 28 26 925, and also EP-A 022 200 describe suitable polymerization processes.

Initiators used in the production of the graft base B1 and/or in the emulsion polymerization of the at least one graft copolymer B can be any desired initiators. It is preferable to use at least one organic and/or inorganic peroxide compound (comprising at least one peroxide group R—O—O—H and/or R—O—O—R) as initiator, e.g. hydrogen peroxide, cumene hydroperoxide, tert-butyl hydroperoxide, p-methane hydroperoxide, ammonium persulfate, potassium persulfate or sodium persulfate. In particular, inorganic peroxide salts are used, examples being peroxodisulfates (persulfates), perphosphates and perborates of ammonium, sodium or potassium. Particular preference is given to sodium persulfates and potassium persulfates.

In a preferred embodiment, an inorganic peroxide salt, in particular an inorganic peroxodisulfate salt, preferably sodium peroxodisulfate and/or potassium peroxodisulfate, is used in the emulsion polymerization of the graft copolymer B.

Emulsifiers used in the production of the graft base B1 and/or in the emulsion polymerization to produce the at least one graft copolymer B can typically comprise conventional anionic emulsifiers. Preference is given to use of the following as emulsifiers: alkyl sulfates, alkylsulfonates, alkyl sulfonic acids, aralkylsulfonates, soaps of saturated or unsaturated fatty acids, and also alkaline disproportionated or hydrogenated abiatic or tall oil acids or a mixture thereof. It is preferable to use emulsifiers having carboxy groups (e.g. disproportionated abiatic acid, salts of $C_{10}$-$C_{18}$-fatty acids, emulsifiers of DE-A 36 39 904 and DE-A 39 13 509). In a preferred embodiment $C_{10}$-$C_{20}$ alkyl sulfonic acids and/or $C_{10}$-$C_{20}$ alkylsulfonates, for example a $C_{12}$-$C_{18}$ paraffin sulfonic acid, are used as emulsifier.

In another preferred embodiment, emulsifiers used can comprise alkaline soaps of sodium salts and potassium salts of disproportionated and/or dehydrogenated and/or hydrogenated and/or partially hydrogenated resins (rosin) with at least 30% by weight content of dehydroabiatic acid and with at most 1% by weight content of abiatic acid.

It is moreover possible to use salts, acids and bases in the emulsion polymerization of the graft base B1 and/or the graft shell B2, in particular to adjust the pH or to buffer the reaction mixture. For example sulfuric acid, phosphoric acid, solutions of sodium hydroxide, potassium hydroxide, sodium salts and potassium salts of carbonates, bicar-bonates, sulfates and/or phosphates (e.g. tetrasodium pyrophosphate) can be used. In a preferred embodiment at least one carbonate and/or bicarbonate salt, such as sodium bicarbonate, is used as buffer.

The polymerization temperature is generally from 25 to 160° C., preferably from 40 to 90° C., in the emulsion polymerization of the graft copolymer B. Conventional temperature control, e.g. isothermal, can be used here; however, conduct of the graft polymerization reaction is preferably such that the temperature difference between start and end of the reaction is at least 10° C., preferably at least 15° C. and particularly preferably at least 20° C.

Typically, the production of the graft copolymer B is achieved in the invention by means of emulsion polymerization. Familiar embodiments of the emulsion polymerization reaction, in batch operation or in continuous operation, are known to the person skilled in the art.

In particular, the monomers of the graft shell B2, i.e. the monomers B21 and B22, separately or in the form of monomer mixture, are continuously added to the graft base B1 in the given quantities and ratios, and polymerized. The monomers here are typically added to the at least one graft base B1 in a manner known to the person skilled in the art.

Particularly, the graft copolymer may comprise two or more graft shells B2 prepared by stepwise polymerization of monomers B21 and/or B22.

Step b)—Precipitation of Graft Copolymer B Latex Using Precipitation Solution PS The inventive process encompasses the precipitation of the at least one graft copolymer B after the emulsion polymerization in step a), wherein the graft copolymer B latex is mixed with at least one precipitation solution PS resulting in a precipitation mixture, wherein the at least one precipitation solution PS comprises at least one alkaline-earth metal salt, preferably at least one salt of magnesium and/or calcium; wherein the precipitation mixture has a solid content of more than 10.2% by weight.

The solid content as mentioned in the present invention, in particular the solid content of the precipitation mixture, is represented by the residue remaining after removal of the volatile content of the precipitation mixture. Typically, the solid content can be determined gravimetrically, for example by drying a specific amount of the precipitation mixture in a convection oven at 180° C., for 23 minutes. In particular the solid content represents the amount of solid and/or dissolved components in the precipitation mixture, in particular the polymer components, such as the polymer components of graft copolymer B, as well as salts and additives used in polymerization process form the solid content.

Preferably, precipitation mixture obtained in step b) has a solid content of equal or more than 10.5% by weight, more preferably equal or more than 11.0% by weight, also preferably equal or more than 12.0% by weight. In particular the solid content of the precipitation mixture obtained in step b) is in the range of 10.3 to 20.0% by weight, preferably 10.5 to 18% by weight, more preferably 11.0 to 17.0% by weight, also preferably 12.0 to 16.0% by weight.

The solid content of the precipitation mixture obtained in step b) refers to the mixture obtained at the end of the precipitation process, i.e. when the total amount of the graft copolymer B latex is mixed with the total amount of the precipitation solution PS. In the case of a continuous precipitation process the solid content refers to the solid content of the precipitation mixture leaving the precipitation reactor in the equilibrium state.

Preferably, after precipitation of the graft copolymer in step b) the precipitated graft copolymer particles exhibit a median particle size $D_{50}$ in the range of 200 to 2000 μm, preferably 500 to 1500 μm. Typically, the particle size and the particle size distribution of the precipitated graft copolymer can be determined via sieve analysis.

The precipitation solution PS comprises at least one alkaline-earth metal salt, preferably at least one salt of magnesium and/or calcium; more preferably at least one magnesium salt. In particular the at least alkaline-earth metal salt is selected from alkaline-earth metal halogenides, such as chlorides, alkaline-earth metal sulfates, alkaline-earth metal phosphates, such as orthophosphates or pyrophosphates, alkaline-earth metal acetates and alkaline-earth metal formats. Preferably the at least one alkaline-earth metal salt is selected from chlorides and sulfates.

Preferred alkaline-earth metal salts here are magnesium sulfate (such as kieserite ($Mg[SO_4] \cdot H_2O$), pentahydrite ($Mg[SO_4] \cdot 5H_2O$), hexahydrite ($Mg[SO_4] \cdot 6H_2O$), and epsomite ($Mg[SO_4] \cdot 7H_2O$, Epsom salt)), magnesium chloride, calcium chloride, calcium formate, magnesium formate or mixtures thereof. The use of magnesium sulfate is particular preferred.

Preferably, the pH of the precipitation mixture obtained in step b) is equal or less than 10, preferably equal or less than 9.5. In particular the pH of the precipitation mixture is in the range of 6 to 10, preferably in the range of 7 to 9.5. In particular the pH as described above is given mainly over the whole step b). For example the pH can be adjusted by the addition of buffer salts, acids and/or bases, wherein for example sulfuric acid, phosphoric acid, solutions of sodium hydroxide, potassium hydroxide, sodium salts and potassium salts of carbonates (e.g. sodium carbonate $Na_2CO_3$ and/or sodium hydrogen carbonate $NaHCO_3$ or mixtures thereof), sulfates or phosphates (e.g. tetrasodium pyrophosphate) can be used.

The buffer salts, acids and/or bases can be added during steps a) and/or b). For example it is preferred to add at least one buffer salt selected from sodium salts, in particular selected from sodium carbonates, sodium sulfates and sodium phosphates, preferably selected from sodium carbonate $Na_2CO_3$ and sodium hydrogencarbonate $NaHCO_3$, preferably during the preparation of the at least one graft copolymer B (emulsion polymerization, step a).

The precipitation solutions PS typically have a concentration of alkaline-earth metal salt in the range from 2 to 25% by weight, preferably 5 to 21% by weight, based on the precipitation solution PS.

In a preferred embodiment the final concentration of the at least one alkaline-earth metal salt in the precipitation mixture is more than 0.8% by weight. Preferably, the precipitation mixture obtained in step b) comprises more than 0.8% by weight, preferably more than 0.85% by weight, more preferably more than 0.9% by weight, of the at least one alkaline-earth metal salt, based on the total mass of the precipitation mixture. Also preferably the precipitation mixture obtained in step b) comprises from 0.85 to 5% by weight, preferably 0.9 to 4% by weight, more preferably 1 to 3% by weight, also preferably 1 to 2% by weight, of the at least one alkaline-earth metal salt (preferably magnesium salt and calcium salt, more preferably magnesium salt), based on the total mass of the precipitation mixture. For example the amounts given above are theoretically calculated based on the alkaline-earth metal salt, e.g. magnesium sulfate. It is obvious for a skilled person that the anions and cations of the alkaline-earth metal salt, e.g. magnesium and sulfate ions, used in the precipitation solution can be present in the precipitation mixture obtained in step b) in different forms, such as dissolved or in different precipitated forms.

Typically, the at least one alkaline-earth metal salt is added in a range from 2 to 20 parts per weight, preferably 7.5 to 15 parts per weight, more preferably 8 to 12 parts per weight, based on 100 parts by weight of solid graft copolymer B.

The precipitation of the at least one graft copolymer B in step b) can be achieved in one or more stages with addition of a plurality of precipitation solutions PS, where the precipitation solutions PS can be identical or different.

The precipitation of the at least one graft copolymer B can preferably be carried out via continuous or batchwise addition of the precipitation solution PS to the graft copolymer B latex or continuous or batchwise addition of graft copolymer B latex to the precipitation solution PS or part of precipitation solution PS. In the case of the continuous addition, the precipitation takes place in at least one continuously operated stirred vessel, preferably in at least two, particularly preferably in at least three, and very particularly preferably in at least four, continuously operated stirred vessels, for example continuous stirred tanks.

In a particularly preferred embodiment, the precipitation solution PS, preferably an aqueous magnesium sulfate solution is metered continuously and simultaneously in one or more stages into the graft copolymer B latex obtained in step a). In a further preferred embodiment, one part of the precipitation solution PS, preferably an aqueous solution of magnesium sulfate, and the graft copolymer B latex obtained in step a), are metered continuously and simultaneously into another part of the precipitation solution PS (pre-charge), preferably an aqueous magnesium sulfate solution.

Typically the precipitation solution PS and the graft copolymer B latex are mixed in step b) over a period in the range of 5 to 30 minutes, preferably 5 to 20 minutes.

The precipitation in step b) can be carried out in a temperature range from 20 to 150° C.; preferably from 40 to 100° C., particularly preferably from 45 to 99° C. Preferably, the graft copolymer B latex is mixed with the at least one precipitation solution PS at a temperature $T_1$ (precipitation temperature) in the range of 30 to 80° C., preferably 35 to 75° C., more preferably 40 to 65° C.

Preferably, the precipitation mixture is kept at a temperature $T_2$ (sintering temperature) in the range of 70 to 140° C., preferably 75 to 135 C, more preferably 90 to 130° C. after mixing the graft copolymer B latex with the at least one precipitation solution PS. In particular the precipitation mixture is kept at said temperature $T_2$ for a period of 2 to 15 minutes, preferably 3 to 10 minutes, more preferably 5 to 10 minutes.

In a preferred embodiment the graft copolymer B latex is mixed with the at least one precipitation solution PS in step b) at a temperature $T_1$ (precipitation temperature) in the range of 30 to 70° C., preferably 40 to 65° C., and afterwards the precipitation mixture is kept for at least 5 minutes at a temperature $T_2$ (sintering temperature) in the range of 70 to 120° C., preferably 80 to 100° C.

In a preferred embodiment the step b) comprises mixing of the graft copolymers B-I and B-II and precipitation of the mixture of the graft copolymers via addition of the precipitation solution comprising at least one salt. In particular here, the graft copolymers B-I and B-II are respectively homogeneously mixed in their latex form after the emulsion polymerization reaction. Further work-up of the resultant latex mixture of the graft copolymers B-I and B-II is achieved as described in the steps c) to e).

Step c)—Mechanical Dewatering of the Precipitated Graft Copolymer B

The inventive process encompasses the mechanical dewatering of the precipitated graft copolymer B, where a graft copolymer B having a water content equal or less than 40% by weight is obtained, and wherein the molar ratio of alkaline metal ions to alkaline-earth metal ions is equal or less than 0.16.

The water content (also termed residual moisture content) of the graft copolymer after dewatering is the content of water in percent by weight, based on the moist graft copolymer B obtained after dewatering. The water content is in particular determined with the aid of suitable analysis equipment (e.g. drying and weighing devices), where the sample is dried until constant weight of the sample is achieved over a defined period. By way of example, the water content of the graft copolymer B can be determined in a Halogen Moisture Analyzer HR73 from Mettler Toledo at 180° C. until constant weight has been achieved for 30 seconds.

In a preferred embodiment the water content of the dewatered graft copolymer obtained in step c) is equal or less than 38% by weight (based on the total dewatered graft copolymer B), preferably equal or less than 35% by weight. Particularly, the water content of the dewatered graft copolymer obtained in step c) is in the range of 10 to 40% by weight, preferably 20 to 38% by weight, more preferably 25 to 35% by weight.

Preferably, the molar ratio of alkaline metal ions to alkaline-earth metal ions in the dewatered graft copolymer B obtained in step c) is equal or less than 0.14, preferably equal or less than 0.12, more preferably equal or less than 0.1. Preferably, the molar ratio of alkaline metal ions to alkaline-earth metal ions is in the range of 0.001 to 0.16, preferably 0.005 to 0.12, more preferably 0.01 to 0.1. In a preferred embodiment this is referred to the molar ratio of sodium to magnesium.

In a preferred embodiment the alkaline metal content of the dewatered graft copolymer B obtained in step c) is equal or less than 200 ppm, preferably in the range of 10 to 200 ppm, preferably 30 to 150 ppm. In particular the sodium content of the dewatered graft copolymer B obtained in step c) is equal or less than 200 ppm, preferably in the range of 10 to 200 ppm, more preferably 30 to 150 ppm.

In a preferred embodiment the alkaline-earth metal content of the dewatered graft copolymer B obtained in step c) is equal or more than 500 ppm, preferably equal or more than 1,000 ppm, preferably in the range of 500 to 5,000 ppm, preferably 1,000 to 2,000 ppm. In particular the magnesium content of the dewatered graft copolymer B obtained in step c) is equal or more than 500 ppm, preferably equal or more than 1,000 ppm, preferably in the range of 500 to 5,000 ppm, preferably 1,000 to 2,000 ppm.

If not defined otherwise, the term ppm means mg/kg according to the present invention.

The alkaline and alkaline-earth metal content in the graft copolymer is typically determined via atom emission spectroscopy with inductive coupled plasma (ICP-AES) after chemical digestion of the polymer sample in nitric acid (e.g. microwave assisted at 200 bar and about 220° C.) and addition of demineralized water.

Typically, step c) of the invention comprises the mechanical dewatering of the precipitated graft copolymer B by means of centrifuging and/or filtration. Preferably, the mechanical dewatering of the precipitated graft copolymer B is preferably achieved by means of centrifuging.

The precipitated graft copolymer is typically centrifuged with a centripetal acceleration of from 200 to 1000 g, preferably from 300 to 800 g, (with g is acceleration due to gravi-ty 1 g=9.81 m/s) for a period of from 1 second to 5 minutes, preferably from 1 to 120 seconds.

Step d)—Optionally Washing of the Dewatered Graft Copolymer B

In another embodiment, the mechanical dewatering of the graft copolymer B in step c) is followed by a washing step d), where the dewatered graft copolymer B is preferably treated with water or with a mixture of water and a polar, water-miscible organic solvent. The water or the mixture is preferably removed by filtration or centrifugation after the treatment. Preferably, in a downstream washing step d) a graft copolymer B is obtained with water content in the range from 10 to 50% by weight, preferably from 20 to 40% by weight, with particular preference from 25 to 35% by weight. It is also preferred that a graft copolymer B is obtained with water content as described above for step c).

For example the washing step d) can be carried out by addition of water or a mixture of water and a polar, water-miscible organic solvent during the centrifugation, in particular in a continuous centrifugation process.

Preferably, the dewatered graft copolymer obtained after an optional washing step exhibits the molar ratio of alkaline metal ions to alkaline-earth metal ions as described above for step c).

Step e)—Optionally Drying of the Dewatered Graft Copolymer B

In one embodiment the process encompasses drying (step e) of the dewatered graft copolymer B obtained in step c) or in an optional washing step d), in a known manner. For example the dewatered graft copolymer B can be dried by hot drying gas, e.g. air, or by means of a pneumatic dryer. Drying can for example be carried out in a cabinet dryer or other common known drying apparatus, such as flash dryer or fluidized bed dryer. Typically, the optional drying step is carried out at a temperature in the range of 50 to 160° C., preferably from 55 to 155° C., particularly preferably from 60 to 150° C.

In one embodiment, the drying of the dewatered graft copolymer B in step e) can be achieved with use of a fluidized-bed drier and/or of a pneumatic drier (flash drier).

Typically, the dried graft copolymer B obtained has water content below 5%, preferably below 1%, preferably in the range from 0.05 to 0.8% by weight, preferably from 0.1 to 0.5% by weight, particularly preferably from 0.1 to 0.3% by weight.

It is also suitable to prepare an thermoplastic molding composition, wherein the graft copolymer B in the form of moist crumb having a water content as described above (for dewatered graft copolymer), is mixed with thermoplastic copolymer A, wherein then the complete drying of the graft copolymer B takes place during the mixing process (step g).

In a preferred embodiment, the graft copolymer B is dried as described in EP-A 0 735 077, wherein the precipitated and dewatered graft copolymer B is directly ex-truded and the residual water is removed from the extruder completely as vapor or partly as vapor and partly in liquid form.

In a preferred embodiment, the alkaline metal content and the alkaline-earth metal content of the dewatered graft copolymer B obtained in step c) do not change or do not significantly change in the optional drying step e). Thus, the alkaline metal content (amount) and the alkaline-earth metal content (amount) of the dried graft copolymer obtained in step e) is equivalent to the alkaline metal content (amount) and the alkaline-earth metal content (amount) of the dewatered graft copolymer B obtained in step c) as described above.

Preferably, the dried graft copolymer, for example obtained as graft copolymer powder, exhibit the same molar ratio of alkaline metal ions to alkaline-earth metal ions as the dewatered graft copolymer obtained after step c), in particular the dried graft copolymer obtained in optional step c) has a molar ratio of alkaline metal ions to alkaline-earth metal ions of equal or less than 0.16, preferably 0.14, more preferably 0.12, even more preferably 0.1. Preferably, the molar ratio of alkaline metal ions to alkaline-earth metal ions in the dried graft copolymer obtained in step e) is in the range of 0.001 to 0.16, preferably 0.005 to 0.12, more preferably 0.01 to 0.1. In a preferred embodiment this molar ratio refers to the molar ratio of sodium to magnesium.

Step f)—Optionally Addition of One or More Optional Components K1

Typically, the inventive process may encompass the addition of one or more optional components K1, preferably selected from additives and auxiliaries (step f).

In particular the graft copolymer composition obtained by the inventive process may comprises 0 to 10% by weight, preferably 0 to 5% by weight, often 0.001 to 5% by weight, more preferably 0.01 to 2% by weight, based on the total graft copolymer composition, of at least one further component K1. Preferably, the at least one component K1 is not a polymeric compound.

The optionally addition of the at least one other component K1 (step f) can be carried out at each stage of the inventive process. In a preferred embodiment the optional step f) encompass the addition of at least one stabilizer, in particular selected from light and heat stabilizers, as component K1 before or during dewatering of the precipitated graft copolymer (step c).

Optional Further Component K1

For example the at least one further component K1 may be selected from commonly known additives and/or auxiliaries for plastic materials. With respect to conventional auxiliaries and additives, reference is made by way of example to "Plastics Additives Handbook", Ed. Gächter and Müller, 4th edition, Hanser Publ., Munich, 1996. For example the at least one additive K1 may be selected from fillers, reinforcing agents, dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents. For example the optional additive K1 can be selected from the additives K2 described below concerning the process for the production of the thermoplastic molding composition.

In a preferred embodiment the additive K1 is selected from common stabilizers for thermoplastic polymers, such as stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones.

Examples of suitable stabilizers are hindered phenols, but also vitamin E and compounds whose structure is analogous thereto. HALS stabilizers (Hindered Amine Light Stabilizers), benzophenones, resorcinols, salicylates, and benzotriazoles are also suitable.

Further the at least one further component K1 can be selected from additives and auxiliaries used for production of the graft copolymer B in step a) as described above, for example selected from surface active agents, buffers salts, stabilizers, and initiators.

Production of a Thermoplastic Molding Composition

Furthermore the present invention is directed to a process for the production of a thermoplastic molding composition comprising the graft copolymer B as described above and at least one thermoplastic styrene copolymer A, optionally at least one further polymeric component C, optionally at least one further component K2, by mixing the components.

In this context, the invention is directed to a process for the production of a thermoplastic molding composition comprising (preferably consisting of):
- A: 5 to 95% by weight, preferably 30 to 95% by weight, more preferably 40 to 90% by weight, based on the thermoplastic molding composition, of at least one thermoplastic copolymer A produced from:
  - A1: 50 to 95% by weight, preferably 60 to 90% by weight, more preferably 60 to 85% by weight, based on the copolymer A, of a monomer A1 selected from styrene, alpha-methylstyrene and mixtures of styrene and at least one other monomer selected from α-methylstyrene, p-methylstyrene and $C_1$-$C_8$-alkyl (meth)acrylate,
  - A2: 5 to 50% by weight, preferably 10 to 40% by weight, more preferably 15 to 40% by weight, based on the copolymer A, of at least one monomer A2 selected from acrylonitrile and mixtures of acrylonitrile and at least one other monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide),
- B: 5 to 95% by weight, preferably 5 to 70% by weight, more preferably 10 to 60% by weight, based on the thermoplastic molding composition, of at least one graft copolymer B as defined above;
- C: 0 to 90% by weight, preferably 0 to 80% by weight, more preferably 0 to 35% by weight, based on the thermoplastic molding composition, of at least one further polymeric component C, and
- K2: 0 to 10% by weight, preferably 0 to 5% by weight, often 0.1 to 5% by weight, based on the thermoplastic molding composition, of at least one further component K2, preferably selected from additives and auxiliaries; comprising the following steps:
- a) to c) and optionally d), e) and/or f) as described above;
- g) mixing the thermoplastic copolymer A, the at least one graft copolymer B, and optionally one or more further polymeric component C and/or optionally one or more further components K2.

Methods and devices for mixing the graft copolymer B with the thermoplastic polymer A and optional the further polymer component C and/or the additive K2 are known by a skilled person. For examples possible mixing apparatuses for carrying out the compounding are, e.g., discontinuously operating heated internal mixers with or without stamp, continuous kneaders such as continuous internal mixers, screw kneaders with axially oscillating screws, Banbury mixers, continuous extruders and roll mills, mixing mills with heated rolls and calander. Typically step g) encompasses melt-compounding and/or melt-extrusion and can typically be carried out using one or more kneaders, extruders and/or twin shaft screw. For the melt extrusion, for example single- or twin-screw extruders are particularly suitable. The use of a twin-screw extruder is preferred.

In some cases, the mechanical energy introduced during mixing by the mixing device already causes a melting of the mixture, so that the mixing device does not need to be heated.

The mixing in step g) may be carried out successively or simultaneously. Furthermore it is suitable to mix some or all of the components at a temperature of 15 to 40° C., for example at room temperature, in a first step, and afterwards raising the temperature up to 200 to 300° C., optionally under addition of further additives, in a second step.

Preferably the mixing is carried out at a temperature in the range of 100 to 400° C., preferably 180 to 300° C. Typically, said temperature depends on the chemical and physical properties of components. Typically, it should be selected so that a substan-tially molten polymer mixture is achieved. In this context the term "molten" means that all components, in particular the polymeric components, are molten except those which should not be molten, e.g. glass fibers or pigment particles. On the other hand, the temperature should not be unnecessarily high in order to avoid thermal damage to the polymer mixture. The mechanical energy introduced may be so high that the mixing device must be even cooled. The mixing apparatus is usually operated at a temperature from 150 to 400° C., preferably 180 to 300 C and has typically different temperature zones as is known to those skilled in the art.

The mixing of the thermoplastic copolymer A, of the at least one graft copolymer B from step c) and optionally of other components K can be achieved in a known manner, either successively or simultaneously. It is moreover possible to begin by mixing some components at a temperature of from 15 to 40° C., in particular at room temperature (about 20° C.), and then to increase the temperature to from 200 to 300° C., optionally with addition of other components.

Thermoplastic Copolymer A

Preferably the thermoplastic copolymer A comprising at least one vinylaromatic monomer is a resin which is free of any latex type polymer (rubber free resin).

Preferably the thermoplastic copolymer A comprises at least 50% by weight of one or more vinylaromatic monomer(s) A1, preferably selected from styrene, α(alpha)-methylstyrene, p(para)-methylstyrene, and optionally at least one further ethylenically unsaturated monomer A2. Further, a preferred thermoplastic copolymer A is prepared from a mixtures of styrene with other co-monomers A2. In particular the at least one thermoplastic copolymer A, can be selected from polystyrene, copolymers of styrene, e.g. styrene acrylonitrile copolymers (SAN), copolymers of α(alpha)-methylstyrene, e.g. α(alpha)-methylstyrene acrylonitrile copolymers (AMSAN). In general, any SAN and/or AMSAN copolymer known in in the art may be used as thermoplastic copolymer A within the subject-matter of the present invention.

Particularly, the thermoplastic copolymer A is selected from SAN and/or AMSAN copolymers comprising less than 36% by weight of acrylonitrile as monomer A2, based on the copolymer A. Preferably the thermoplastic copolymer A comprises the at least one vinylaromatic monomer A1, preferably styrene, in an amount of 50 to 99% by weight, preferably 60 to 95% by weight, also preferably 65 to 90% by weight, more preferably 65 to 70% by weight, and at least one vinyl cyanide monomer A2, preferably acrylonitrile, in an amount of 1 to 50% by weight, preferably 5 to 40% by weight, also preferably 10 to 35% by weight, more preferably 30 to 35% by weight.

In a preferred embodiment the at least on thermoplastic copolymer A comprises (preferably consists of):
A1: 50 to 99% by weight, preferably 50 to 95% by weight, more preferably 60 to 90% by weight, also preferably 60 to 85% by weight, based on the copolymer A, of the at least one vinylaromatic monomer A1, selected from styrene, α(alpha)-methylstyrene or mixtures of styrene and at least one further monomer selected from α(alpha)-methylstyrene, p(para)-methylstyrene and $C_1$-$C_8$ alkyl(meth)acrylate, A2: 1 to 50% by weight, preferably 5 to 50% by weight, more preferably 10 to 40% by weight, also preferably 15 to 40% by weight, based on the copolymer A, of at least one further ethylenically unsaturated monomer A2, selected from acrylonitrile or mixtures of acrylonitrile and at least one further monomer selected from methacrylonitril, acrylamide, vinylmethyl ether, anhydrides of unsaturated carboxylic acids and imides of unsaturated carboxylic acids.

In particular, a thermoplastic copolymer A comprising 35% by weight or less, acrylonitrile, based on the total copolymer A, is preferred.

In a preferred embodiment of the invention the at least on vinylaromatic monomer A1 is styrene or alpha-methylstyrene, and the at least one further ethylenically unsaturated monomer A2 is acrylonitrile. In a further preferred embodiment of the invention monomer A1 is a mixture of styrene and α(alpha)-methylstyrene and monomer A2 is acrylonitrile, wherein the mixture A1 preferably comprises at least 10% by weight, preferably at least 50% by weight and more preferably at least 90% by weight, based on the total amount of monomer A1, styrene.

In a preferred embodiment the thermoplastic copolymer A is composed of the monomers A1 and A2, wherein the at least one vinylaromatic monomer A1 is selected from styrene, α(alpha)-methylstyrene, and mixtures thereof; and the at least one further ethylenically unsaturated monomer A2 is acrylonitrile or a mixture of acrylonitrile and methacrylonitrile.

Especially preferred thermoplastic copolymers A are copolymers comprising (preferably consisting of):
A1: 60 to 95% by weight, preferably 60 to 90% by weight, more preferably 60 to 85% by weight, also preferably 65 to 80% by weight, based on the total copolymer A, of the at least one vinylaromatic monomer A1, selected from styrene, α(alpha)-methylstyrene or mixtures of styrene and α(alpha)-methylstyrene; and
A2: 5 to 40% by weight, preferably 10 to 40% by weight, more preferably 15 to 40% by weight, also preferably 20 to 35% by weight, based on the total copolymer A, of the at least one further ethylenically unsaturated monomer A2, selected from acrylonitrile or mixtures of acrylonitrile and methacrylonitril.

In a preferred embodiment the thermoplastic copolymer A is produced from (preferably consisting of):
A1: 64 to 95% by weight, based on the copolymer A, of monomer A1 selected from styrene and mixtures of styrene and at least one other monomer selected from α-methylstyrene, p-methylstyrene and $C_1$-$C_8$-alkyl (meth)acrylate,
A2: 5 to 36% by weight, based on the copolymer A, of monomer A2 selected from acrylonitrile.

In a preferred embodiment the thermoplastic copolymer A is produced from (preferably consisting of):
A1: 67 to 95% by weight, based on the copolymer A, of monomer A1 selected from styrene or alpha-methylstyrene,
A2: 5 to 33% by weight, based on the copolymer A, of monomer A2 selected from acrylonitrile.

In particular the weight-average molecular weight ($M_w$) of the thermoplastic copolymer A is in the range of 15,000 to 200,000 g/mol, preferably in the range of 30,000 to 150,000 g/mol. Typically, the number-average molar mass ($M_n$) of the thermoplastic copolymer A amounts from 15,000 to 100,000 g/mol. Preferably the average molecular weight can be determined by gel permeation chromatography (GPC) relative to polystyrene as standard and using for example UV detection. Preferably the thermoplastic copolymer A exhibits a viscosity number VN (determined according to DIN 53726 at 25° C., 0.5% by weight in dimethylformamide) from 50 to 120 ml/g, preferably from 50 to 100 ml/g, more preferably from 55 to 85 ml/g.

In a preferred embodiment the thermoplastic copolymer A is a SAN (styrene acrylonitrile copolymer) or AMSAN (alpha-methylstyrene acrylonitrile copolymer) copolymer, which exhibits average molecular weight and/or viscosity in the above mentioned ranges.

The copolymer A can be prepared by all commonly known method, for example bulk polymerization, solution polymerization, suspension polymerization and emulsion polymerization or mixed process, e.g. mass/suspension polymerizations, with or without further components. Synthesis of thermoplastic copolymers A is possible via thermal initiation or via addition of initiators, especially radical initiators, like for example peroxides. Suitable thermoplastic copolymers A are preferably produced via bulk or solution polymerization, preferably via radical initiated bulk or solution polymerization.

More preferably the thermoplastic copolymer A is prepared from the components acrylonitrile and styrene and/or α-methylstyrene via bulk polymerization or in the presence of one or more solvents, for example, toluene or ethylbenzene. A polymerization process is for example described in Kunststoff-Handbuch [Plastics Handbook], Vieweg-Daumiller, volume V, (Polystyrol) [Polystyrene], Carl-Hanser-Verlag, Munich 1969, pages 122 et seq.

Details are described for example in U.S. Pat. Nos. 4,009,226 and 4,181,788 concerning the production of SAN and/or AMSAN resins by bulk polymerization or solution polymerization. Further, the synthesis of thermoplastic copolymer A is for example described in DE-A 24 20 358 and DE-A 27 24 360. Suitable thermoplastic copolymers are also described in DE-A 19713509.

Further Polymer Component C

Optionally, the thermoplastic molding composition comprises 0 to 90% by weight, preferably 0 to 60% by weight, also preferably 0.5 to 30% by weight, more preferably 30 to 90% by weight, even more preferably 30 to 60% by weight, based on the total molding composition, at least one further polymer component C. Preferably, the optional polymer component C is selected from polycarbonates (including aromatic polycarbonates and aromatic polyester carbonates), polyamides, and polyesters, more preferably from polycarbonates and polyamides.

In a preferred embodiment the thermoplastic molding composition comprises 5 to 60% by weight, preferably 20 to 60% by weight, more preferably 30 to 60% by weight, based on the total molding composition, at least one further polymer component C selected from polycarbonates, polyamides, and polyesters, preferably from polycarbonates and polyamides.

Preferably, the at least one further polymer component C is at least one aromatic polycarbonate and/or at least one aromatic polyester carbonate.

Suitable aromatic polycarbonates and/or aromatic polyester carbonates are described in the state of the art and may be prepared by known processes. For example the preparation of aromatic polycarbonates is described in Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396. For example the preparation of aromatic polyester carbonates is described in DE-A 3 077 934. In particular the preparation of aromatic polycarbonate and/or aromatic polyester carbonate is carried out by reacting diphenols, preferably bisphenol A, carbonic acid halides, preferably phosgene, and optionally aromatic dicarboxylic acid halides, preferably benzenedicarboxylic acid halides. In particular suitable aromatic polycarbonates and aromatic polyester carbonates and their preparation are described in DE-A 2 714 544, DE-A 3 000 610, DE-A 3 832 396 and DE-A 3 077 934.

The aromatic polycarbonate and/or aromatic polyester carbonates used as component C may be either linear or branched in a known manner. Branching agents which may be used are carboxylic acid chlorides which are trifunctional or more than trifunctional, for example described in DE-A 2 940 024 and DE-A 3 007 934, or phenols which are trifunctional or more than trifunctional.

Typically aromatic polycarbonates and polyester carbonates suitable as component C have average weight-average molecular weights ($M_w$, measured e.g. by ultracentrifuge or scattered light measurement) from 10,000 to 200,000 g/mol, preferably 15,000 to 80,000 g/mol, particularly preferably 24,000 to 32,000 g/mol.

The relative solution viscosity (rei) of the aromatic polycarbonates and polyester carbonates used as component C is typically in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. More preferably only one type of polycarbonate is used.

Preferably the aromatic polycarbonate used as component C is a polycarbonate based on bisphenol A and phosgene, which includes polycarbonates that have been prepared from corresponding precursors or synthetic building blocks of bisphenol A and phosgene.

Also preferably, the at least one further polymer component C can be at least one polyamide selected from homo polyamides, co polyamides and mixtures of such polyamides. Suitable polyamides and methods for their production are known from the state of the art. In particular suitable semi-crystalline polyamides are polyamide-6, polyamide-6,6, mixtures and corresponding copolymers of those components. Also included are polyamides wherein the acid component consists wholly or partially of terephthalic acid, isophthalic acid, suberic acid, sebacic acid, azelaic acid, adipic acid and/or cyclohex-anedicarboxylic acid, the diamine component consists wholly or partially of m- and/or p-xylylene-diamine, hexamethylenediamine, 2,2,4-trimethylhexamethylenediamine, 2,2,4-trimethylhexamethylene-diamine and/or isophoronediamine, In particular amorphous polyamides can be used as further component C, which are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethyl-cyclo-hexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Preferably, the polyamides suitable as component C have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

Additive(s) K2

In particular the thermoplastic molding composition obtained by the inventive process may comprises 0 to 10% by weight, preferably 0 to 5% by weight, often 0.1 to 5% by weight, based on the total thermoplastic molding composition, of at least one additive K2. More preferably the at least one additive K2 is present in an amount of 0.001 to 10% by weight, more preferably 0.01 to 5% by weight, based on the total thermoplastic molding composition. In particular the additive K is not a polymeric compound.

The optional additive K2 may be selected from commonly known additives and/or auxiliaries for plastic materials.

With respect to conventional auxiliaries and additives, reference is made by way of example to "Plastics Additives Handbook", Hans Zweifel 6th Edition, Hanser Publ., Munich, 2009. For example the at least one additive K may be selected from fillers, reinforcing agents, dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents.

The optional additive K2 is preferably selected from dyes, pigments, lubricants or mold-release agents, stabilizers, in particular light stabilizers, antistatic agents, flame retardants and fillers, in particular mineral fillers.

Examples that may be mentioned of fillers, which may be selected from particulate fillers or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibers or glass fibers in the form of glass woven, glass mats, or glass silk rovings, chopped glass, or glass beads. In particular at least one particulate fillers, preferably a mineral filler, can be used as additive K.

Examples of suitable pigments are titanium dioxide, phthalocyanines, ultramarine blue, iron oxides, or carbon black, and also the entire class of organic pigments.

Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto. HALS stabilizers (Hindered Amine Light Stabilizers), benzophenones, resorcinols, salicylates, and benzotriazoles are also suitable.

Suitable lubricants or mold-release agents are fatty acids having from 12 to 30 carbon atoms, salts and derivatives thereof, for example stearic acid and stearates, palmitic acid and palmitates, stearyl alcohol, stearic esters, amide waxes (e.g. stearamides, in particular ethylene bis(stearamide) (EBS)), and polyolefin waxes. Particularly suitable lubricants and mold-release agents are stearic acid, stearates (e.g. magnesium stearate), palmitic acid, palmitates (e.g. sodium palmitate), ethylene bis(stearamide) (e.g. Irgawax®, Ciba, Switzerland) and mixtures thereof. Preferably the thermoplastic molding composition comprises 0.05 to 5% by weight, preferably 0.1 to 3% by weight, based on the total thermoplastic molding composition, of at least one lubricant or mold-release agents, more preferably ethylene bis(stearamide), at least one alkaline metal or alkaline earth metal stearate and/or at least one alkaline metal or alkaline earth metal palmitate. In a preferred embodiment the thermoplastic molding composition comprises 0.1 to 5% by weight, based on the total thermoplastic molding composition potassium stearate and/or potassium palmitate.

In particular the thermoplastic molding composition can optionally comprise 0 to 2% by weight, preferably 0.01 to 2% by weight, at least one common processing aid, e.g. selected from lubricant and mould release agents and antistatic agents.

In particular the thermoplastic molding composition can optionally comprise 0 to 10% by weight, preferably 0.1 to 10% by weight, pigments and/or colorants, in particular selected from titanium dioxide, phthalocyanines, ultramarine blue, iron oxides, or carbon black, and also the entire class of organic pigments.

Furthermore, it is possible that the thermoplastic composition comprises as component K2 residues of the at least one additive K1 used for production of the graft copolymer B as described above, selected from surface active agents, buffers salts, stabilizers, initiators.

The invention also provides graft copolymers B and thermoplastic molding compositions obtainable via the processes of the invention, and also the moldings produced therefrom.

The thermoplastic molding compositions can be used for the production of molded articles, such as sheets, semi-finished products, films, fibers foams etc. Processing may be carried out using the known processes for thermoplastic processing, in particular production may be effected by thermoforming, extruding, injection molding, calendaring, blow molding, compression molding, press sintering, deep drawing or sintering, preferably by injection molding.

The molding compositions of the invention can be used for the production of moldings of any type. These can be produced via injection molding, extrusion and blow molding processes. Another type of processing is the production of moldings via thermoforming from sheets or films previously produced, and the process of film-overmolding. Examples of these moldings are films, profiles, housing parts of any type, e.g. for household devices such as juice presses, coffee machines, mixers; for office equipment such as monitors, printers, copiers; exterior and interior parts of automobiles; sheets, pipes, electrical installation ducts, windows, doors and other profiles for the construction sector (fitting-out of interiors and outdoor applications), and also parts for electrical and electronic uses, such as switches, plugs and sockets.

In particular, the molding compositions of the invention can by way of example be used for the production of the following moldings:

Parts for the fitting-out of interiors of rail vehicles, ships, aircraft, buses and other motor vehicles, bodywork components for motor vehicles, housings of electrical equipment containing small transformers, housings for equipment for the processing and transmission of information, housings and cladding for medical equipment, massage equipment and housings therefor, toy vehicles for children, sheet-like wall elements, housings for safety equipment, thermally insulated transport containers, apparatus for the keeping or care of small animals, moldings for sanitary and bath equipment, protective grilles for ventilator openings, moldings for garden sheds and tool sheds, housings for garden equipment.

The invention is described in more detail by the following examples and claims.

EXAMPLES

1. Step a: Preparation of Styrene-Co-Acrylonitrile Grafted Polybutylacrylate Latices (Graft Copolymer B Latex)

The following graft copolymers latices B-1 and B-2 were prepared:

a. Preparation of Graft Copolymer B-1 Latex (Basic Rubber Latex L1: Graft Rubber Latex L2:)

The reaction vessel was charged with 90.2 parts of demineralized water, 0.61 parts of the sodium salt of a $C_{12}$-$C_{18}$ paraffin sulfonic acid and 0.23 parts sodium bicarbonate. When the temperature in the reaction vessel reached 59° C. 0.16 parts of sodium persulfate, dissolved in 5 parts of demineralized water, were added. A mixture of 59.51 parts butyl acrylate and 1.21 parts tricyclodecenylacrylate was added within a period of 210 min. Afterwards the reaction was continued for 60 min. Finally the polymer dispersion (graft base B1-1) had a total solid content of 39.6% and the latex particles had a mean particle diameter $D_w$ (determined by turbidity) of 75 nm.

An amount of 151.9 parts of the graft base B1-1 as described above was added to the reaction vessel together with 92.2 parts of demineralized water and 0.14 parts of sodium persulfate, dissolved in 3.22 parts of demineralized water. Within a period of 190 min a mixture of 31.18 parts of styrene and 9.31 parts of acrylonitrile was added at a temperature of 61° C., followed by a post polymerization time of 60 min at 65° C. A graft copolymer latex B-1 (polymer dispersion) with a total solid content of 35.5% was obtained. The latex particles had a mean particle diameter $D_w$ (determined by turbidity) of 87 nm.

b. Preparation of Graft Copolymer B-2 Latex (Basic Rubber Latex L3/Graft Rubber Latex L4)

The reaction vessel was charged with 70.66 parts of demineralized water, 0.3 parts of the graft base B1-1 (obtained as described above having a particle diameter of 75 nm) and 0.23 parts of sodium bicarbonate. After heating the reaction vessel to 60° C., 0.16 parts of sodium persulfate, dissolved in 5 parts demineralized water, were added to the reaction mixture. A mixture of 59.51 parts butyl acrylate and 1.21 parts tricyclodecenylacrylate was added within a period of 210 min. In parallel to the first feed a solution of 0.36 parts of the sodium salt of a $C_{12}$-$C_{18}$ paraffin sulfonic acid in 16.6 parts demineralized water was also added over a period of 210 min. After 200 min, from starting the feed, the temperature was ramped to 65° C. Afterwards the reaction was continued for 60 min at 65° C. Finally the polymer dispersion (graft base B1-2) had a total solid content of 39.4% and the latex particles had a mean particle diameter $D_w$ (determined by turbidity) of 440 nm (determined by turbidity).

An amount of 154 parts of the graft base B1-2 as described above was added to the reaction vessel together with 88.29 parts of demineralized water, 0.11 parts of the sodium salt of a $C_{12}$-$C_{18}$ paraffin sulfonic acid and 0.14 parts of sodium persulfate, dissolved in 5.61 parts of demineralized water. The reaction mixture was heated to 61° C. Within a period of 60 min 13.16 parts styrene were added at a temperature of 61° C., followed by a post polymerization time of 90 min, where the temperature was increased from 61° C. to 65° C. Then a mixture of 20.5 parts of styrene and 6.83 parts of acrylonitrile were added to the reaction over a period of 150 min. The reaction was continued at 65° C. for another 60 min. A polymer dispersion with a total solid content of 35.2% was obtained. The latex particles had a mean particle diameter $D_w$ (determined by turbidity) of 500 nm (determined by turbidity).

2. Step b: Precipitation of the Graft Copolymer Latex B (Step b)

The graft copolymer latices B-1 and B-2, which were prepared as described above, were precipitated using $MgSO_4$ solution as precipitation solution PS using different precipitation conditions (e.g. temperature, $MgSO_4$ concentration, ratio of sodium to potassium).

The precipitated graft copolymers B (graft copolymer B slurries) were obtained as described in the following. The resulting slurries were transferred to a centrifuge, having a diameter of 400 mm, and centrifuged for 60 s at 1650 rpm, which results centripetal force of 614 G. The dewatered graft copolymer B was obtained in form of a wet powder.

Residual humidity of the dewatered graft copolymers was determined by Mettler Toledo HR73 Halogen Moisture Analyzer. Sodium and magnesium content were determined by ICP-OES using the dried graft copolymer B powder, i.e. after drying the dewatered graft copolymers in a lab oven at 70° C. for 2 days.

The influence of different precipitation conditions on residual humidity after centrifugation was investigated and the results are summarized in table 1 below.

Example E-1 (Comparative)

112.5 g of a $MgSO_4$ solution (19.9 wt.-%) were mixed with 2143.1 g demineralized water. 451.1 g of this solution were used as pre-charge and heated to 60° C. 900 g of graft copolymer B-1 latex and 1804.5 g of the remaining diluted $MgSO_4$ solution were added separately within 10 min, while the temperature was kept at 60° C. Then the resulting mixture was heated to 92° C. for 5 min (sintering)

The resulting slurry was processed as described in the general procedure above.

Example E-2 (Inventive)

147.9 g of a $MgSO_4$ solution (20 wt.-%) were mixed with 1358.8 g demineralized water. 301.3 g of this solution was used as pre-charge and heated to 60° C. 900 g of graft copolymer B-1 latex and 1205.3 g of the remaining diluted MgSO4 solution were added separately within 10 min, while the temperature was kept at 60° C. Then the resulting mixture was heated to 92° C. for 5 min (sintering).

The resulting slurry was processed as described in the general procedure above.

Example E-3 (Inventive)

147.9 g of a $MgSO_4$ solution (20.4 wt.-%) were mixed with 1207.8 g demineralized water. 271.1 g of this solution was used as pre-charge and heated to 60° C. 900 g of graft copolymer B-1 latex and 1084.5 of the remaining diluted MgSO4 solution were added separately within 10 min, while the temperature was kept at 60° C. Then the resulting mixture was heated to 92° C. for 5 min (sintering).

The resulting slurry was processed as described in the general procedure above.

Example E-4 (Inventive)

147.9 g of a $MgSO_4$ solution (20.4 wt.-%) were mixed with 905.9 g demineralized water. 210.7 g of this solution was used as pre-charge and heated to 50° C. 900 g of graft copolymer B-1 latex and 843 g of the remaining diluted $MgSO_4$ solution were added separately within 10 min, while the temperature was kept at 50° C. Then the resulting mixture was heated to 92° C. for 5 min (sintering).

The resulting slurry was processed as described in the general procedure above.

Example E-5 (Comparative)

87.5 g of a $MgSO_4$ solution (19.9 wt.-%) were mixed with 2121.4 g demineralized water. 441.8 g of this solution was used as pre-charge and heated to 88° C. 900 g of graft copolymer B-2 latex and 1767.1 g of the remaining diluted $MgSO_4$ solution are added separately within 10 min, while the temperature is kept at 88° C. Then the resulting mixture is heated to 99° C. for 5 min (sintering).

The resulting slurry was processed as described in the general procedure above.

Example E-6 (Inventive)

133 g of a MgSO$_4$ solution (20.4 wt.-%) were mixed with 1207.1 g demineralized water. 268 g of this solution was used as pre-charge and heated to 70° C. 900 g of graft copolymer B-2 latex and 1072.1 g of the remaining diluted MgSO$_4$ solution were added separately within 10 min, while the temperature was kept at 70° C. Then the resulting mixture is heated to 130° C. for 5 min (sintering).

The resulting slurry was processed as described in the general procedure above.

The precipitation conditions and the results are summarized in the following table 1.

TABLE 1

Graft copolymer compositions

| Example | E1 (comp.) | E2 | E3 | E4 | E5 (comp.) | E6 |
|---|---|---|---|---|---|---|
| Graft copolymer B latex | B-1 | B-1 | B-1 | B-1 | B-2 | B-2 |
| solid polymer [parts] | 100 | 100 | 100 | 100 | 100 | 100 |
| solid MgSO$_4^1$ [parts] | 7 | 10 | 10 | 10 | 5.5 | 9 |
| DM water$^1$ [parts] | 667 | 450 | 400 | 300 | 670 | 400 |
| Precipitation temp. [° C.] | 60 | 60 | 60 | 50 | 88 | 70 |
| Sintering temp. [° C.] | 92 | 92 | 92 | 92 | 99 | 130 |
| Total solid content$^2$ [%] | 10.2 | 12.7 | 13.6 | 15.7 | 10.2 | 13.6 |
| MgSO$_4$ concentration$^3$ [%] | 0.8 | 1.4 | 1.5 | 1.8 | 0.6 | 1.4 |
| residual humidity after centrifugation [%] | 43 | 33 | 30 | 29 | 54 | 35 |
| Na [ppm] | 220 | — | 52 | 96 | 380 | 90 |
| Mg [ppm] | 1300 | — | 1500 | 1800 | 1600 | 1600 |
| molar ratio Na/Mg | 0.179 | — | 0.037 | 0.056 | 0.251 | 0.059 |

$^1$solid MgSO$_4$ and demineralized water (DM) are given as part of weights based on 100 parts solid content of graft copolymer B.
$^2$The solid content was determined based on the amount of the components used.
$^3$MgSO$_4$ concentration is given in % by weight based on the total weight of the precipitation mixture.

It is clearly shown that a high alkaline to earth alkaline ratios (ratio Na/Mg) are unfavor-able due to the higher residual humidity. Above a molar Na/Mg ratio of 0.16 dewatering of the precipitated graft copolymer latex is significantly worse.

3. Test Procedures
  a. The particle size of the graft base B1 and the graft copolymer B latices were determined as mean particle diameter D$_w$ determined by turbidity as described in Lange, Kolloid-Zeitschrift und Zeitschrift für Polymere, Band 223, Heft 1.
  b. Residual humidity of the graft copolymers B after centrifugation was determined by Mettler Toledo HR73 Halogen Moisture Analyzer.
  c. Sodium and magnesium content in the graft copolymers B was determined by atom emission spectroscopy with inductive coupled plasma (ICP-AES) after chemical digestion. The dewatered graft copolymers B were dried in a lab oven at 70° C. for 2 days. Afterwards 200 mg of the polymer sample was dissolved in 5 ml nitric acid (microwave assisted at about 200 bar (total pressure of the digestion mixture) and about 220° C.).

The solution obtained was diluted with Millipore water and determined via ICP-AES. A calibration series is obtained by dilution of certified reference material.

The invention claimed is:
1. A process for the production of a graft copolymer composition comprising:
  B: from 90 to 100% by weight of at least one graft copolymer B comprising:
    B1: 50 to 90% by weight, based on the graft copolymer B, of at least one graft base B1, obtained by emulsion polymerization of:
      B11: 50 to 100% by weight, based on the graft base B1, of at least one monomer B11 selected from C$_1$-C$_8$ alkyl(meth)acrylate and butadiene;
      B12: 0 to 10% by weight, based on the graft base B1, of at least on poly-functional cross-linking monomer B12; and
      B13 0 to 50% by weight, based on the graft base B1, of at least one further monomer B13 selected from styrene, α-methylstyrene, C$_1$-C$_4$-alkylstyrene, acrylonitrile, methacrylonitrile, isoprene, butadiene, chloroprene, methyl(meth)acrylate, alkylenglycol-di(meth)acrylate, and vinylmethylether;
      where the sum of B11, B12, and B13 equals 100% by weight; and
    B2: 10 to 50% by weight, based on the graft copolymer B, of at least one graft shell B2, which is obtained via emulsion polymerization in the presence of the at least one graft base B1 of:
      B21: 50 to 100% by weight, based on graft shell B2, of at least one monomer B21 selected from styrene, α-methylstyrene or mixtures of styrene and at least one further monomer selected from α-methylstyrene, p-methylstyrene, and C$_1$-C$_8$ alkyl(meth)acrylate; and
      B22: 0 to 50% by weight, based on graft shell B2, of at least one monomer B22 selected from acrylonitrile or mixtures of acrylonitrile and at least one further monomer chosen from methacrylonitrile, acrylamide, vinylmethyl ether, anhydrides of unsaturated carboxylic acids, and imides of unsaturated carboxylic acids;
    where the total sum of graft base B1 and graft shell B2 equals 100% by weight; and
  K1: from 0 to 10% by weight of at least one other component K1;
comprising the following steps:
  a) preparation of the at least one graft copolymer B encompassing emulsion polymerization of the mono- mers B21 and B22 in the presence of at least one graft base B1 to form the at least one graft shell B2, wherein the graft copolymer B is obtained in the form of a latex;

b) precipitation of the at least one graft copolymer B after its emulsion polymerization in step a), wherein the graft copolymer B latex is mixed with at least one precipitation solution PS resulting in a precipitation mixture, wherein the at least one precipitation solution PS comprises at least one alkaline-earth metal salt, and wherein the precipitation mixture has a solid content of more than 10.2% by weight;

c) mechanical dewatering of the precipitated graft copolymer B, where a graft copolymer B having a water content equal or less than 40% by weight is obtained, and wherein the molar ratio of alkaline metal ions to alkaline-earth metal ions in the graft copolymer B is equal or less than 0.16;

d) optionally washing of the dewatered graft copolymer B;

e) optionally drying of the dewatered graft copolymer B obtained in step c) or d); and f) optionally addition of one or more optional components K1.

2. The process of claim 1, wherein the at least one graft base B1 is obtained by emulsion polymerization of:

B11: 70 to 99.9% by weight, based on the graft base B1, of at least one $C_1$-$C_8$ alkyl(meth)acrylate as monomer B11;

B12: 0.1 to 10% by weight, based on the graft base B1, of at least on poly-functional cross-linking monomer B12; and B13 0 to 29.5% by weight, based on the graft base B1, of at least one further monomer, selected from styrene, α-methylstyrene, $C_1$-$C_4$-alkylstyrene, acrylonitrile, methacrylonitrile, isoprene, butadiene, chloroprene, methyl(meth)acrylate, alkylenglycol-di(meth)acrylate, and vinylmethylether;

where the sum of B11, B12, and B13 equals 100% by weight.

3. The process of claim 1, wherein the graft copolymer B comprises:

B1: 50 to 70% by weight, based on the graft copolymer B, of exactly one, graft base B1; and B2: 30 to 50% by weight, based on the graft copolymer B, of exactly one graft shell B2, obtained by emulsion polymerization, in the presence of the graft base B1, of:

B21: 50 to 95% by weight, based on the graft shell B2, of at least one vinylaromatic monomer B21 selected from styrene, α-methylstyrene or mixtures of styrene with α-methylstyrene or methyl(meth)acrylate; and B22: 5 to 50% by weight, based on the graft shell B2, of at least one ethylenically unsaturated monomer B22 selected from acrylonitrile or mixtures of acrylonitrile and methacrylonitrile;

wherein the total sum of graft base B1 and graft shell B2 is 100% by weight, and wherein the graft copolymer latex obtained in step a) has a particle size in the range of 60 to 140 nm.

4. The process of claim 1, wherein the graft copolymer B comprises:

B1: 50 to 70% by weight, based on the graft copolymer B, of at least one graft base B1;

B2': 10 to 20% by weight, based on the graft copolymer B, of at least one graft shell B2', which is obtained by emulsion polymerization, in the presence of graft base B1, of:

B21' 100% by weight, based on graft shell B2', of at least one vinylaromatic monomer B21' selected from styrene, α-methylstyrene or a mixture of styrene and at least one further monomer selected from a-methylstyrene, p-methylstyrene, and $C_1$-$C_4$-alkyl(meth) acrylate; and B2": 20 to 30% by weight, based on the graft copolymer B, of at least one graft shell B2", which is obtained by emulsion polymerization, in the presence of graft base B1 grafted with B2', of:

B21": 70 to 80% by weight, based on the graft shell B2", of at least one vinylaromatic monomer B21" selected from styrene, α-methylstyrene or mixtures of styrene and α-methylstyrene or methyl(meth) acrylate; and B22": 20 to 30% by weight, based on the graft shell B2", of at least one ethylenically unsaturated monomer B22" selected from acrylonitrile or mixtures of acrylonitrile an methacrylonitrile;

wherein the total sum of graft base B1, graft shell B2', and graft shell B2" is 100% by weight, and wherein the graft copolymer latex obtained in step a) has a particle size in the range of 400 to 700 nm.

5. The process of claim 1, wherein the solid content of the precipitation mixture obtained in step b) is in the range from 10.3 to 20% by weight.

6. The process of claim 1, wherein the graft copolymer B latex is mixed with the at least one precipitation solution PS in step b) at a temperature $T_1$ in the range of 30 to 70° C. and afterwards the precipitation mixture is kept for at least 5 minutes at a temperature $T_2$ in the range of 70 to 120° C.

7. The process of claim 1, wherein the precipitation mixture obtained in step b) comprises more than 0.8% by weight of the at least one alkaline-earth metal salt, based on the total mass of the precipitation mixture.

8. The process of claim 1, wherein the pH of the precipitation mixture obtained in step b) is equal to or less than 10.

9. The process of claim 1, wherein the dewatered graft copolymer B obtained in step c) has a water content in the range from 20 to 38% by weight.

10. The process of claim 1, wherein the molar ratio of alkaline metal ions to alkaline-earth metal ions in the dewatered graft copolymer B obtained in step c) is in the range of 0.01 to 0.1.

11. A process for the production of a thermoplastic molding composition comprising:

A: 5 to 95% by weight of at least one thermoplastic copolymer A produced from:

A1: 50 to 95% by weight, based on the copolymer A, of a monomer A1 selected from styrene, α-methylstyrene and mixtures of styrene and at least one other monomer selected from α-methylstyrene, p-methylstyrene, and $C_1$-$C_8$-alkyl (meth)acrylate; and A2: 5 to 50% by weight, based on the copolymer A, of at least one monomer A2 selected from acrylonitrile and mixtures of acrylonitrile and at least one other monomer selected from methacrylonitrile, acrylamide, vinylmethyl ether, anhydrides of unsaturated carboxylic acids, and imides of unsaturated carboxylic acids;

B: 5 to 95% by weight of at least one graft copolymer B as defined in claim 1;

C: 0 to 90% by weight of at least one further polymeric component C; and

K2: 0 to 10% by weight of at least one further component K2;

comprising the following steps:

a) to c) and optionally d) to f) as described in claim 1;

g) mixing the thermoplastic copolymer A, the at least one graft copolymer B, and optionally one or more further polymeric component C and/or optionally one or more further components K2.

12. The process of claim 11, wherein the thermoplastic copolymer A is produced from:

A1: 64 to 95% by weight, based on the copolymer A, of monomer A1 selected from styrene and mixtures of styrene and at least one other monomer selected from α-methylstyrene, p-methylstyrene, and $C_1$-$C_8$-alkyl (meth)acrylate; and A2: 5 to 36% by weight, based on the copolymer A, of monomer A2 selected from acrylonitrile.

13. The process of claim 11, wherein the thermoplastic molding composition comprises:

C: 20 to 60% by weight, based on the total molding composition, of at least one further polymer component C selected from polycarbonates, polyamides, and polyesters.

14. The process of claim 11, wherein the mixing in step g) is carried out at a temperature in the range of 180 to 300° C.

15. A graft copolymer composition obtained by the process of claim 1.

16. A thermoplastic molding composition obtained by the process of claim 11.

* * * * *